United States Patent [19]

Ando et al.

[11] 4,063,264
[45] Dec. 13, 1977

[54] MEANS FOR MOUNTING AN INTERCHANGEABLE LENS ON A SINGLE LENS REFLEX CAMERA

[75] Inventors: Yoshikazu Ando, Musashino; Junichi Yokozato, Kawagoe, both of Japan

[73] Assignee: Zenza Bronica Industries, Inc., Tokyo, Japan

[21] Appl. No.: 708,742

[22] Filed: July 26, 1976

[51] Int. Cl.[2] .............................................. G03B 17/00
[52] U.S. Cl. ..................................... 354/286; 350/257
[58] Field of Search ................. 350/257; 354/286, 152

[56] References Cited

U.S. PATENT DOCUMENTS

| | | | |
|---|---|---|---|
| 3,714,878 | 2/1973 | Hasegawa et al. | 354/152 X |
| 3,906,534 | 9/1975 | Shirasaki | 354/286 |
| 3,968,504 | 7/1976 | Komine | 354/286 |
| 3,982,257 | 9/1976 | Togashi | 354/286 |

*Primary Examiner*—Richard A. Wintercorn

*Attorney, Agent, or Firm*—Gerald J. Ferguson, Jr.; Joseph J. Baker

[57] ABSTRACT

An interchangeable lens having a shutter unit is provided with a relay shaft which is to be connected with a shutter operating mechanism in the camera body. The camera body is provided on the front face with a fixed pin and an axially movable pin which sandwich the relay shaft of the lens therebetween. The camera body is further provided with a lock pin which is connected with the axially movable pin so that the latter is retracted by the depression of the lock pin when the interchangeable lens is attached to the camera body. The lens is first attached to the camera body and then rotated until it is stopped by a stopper. When the lens is stopped, the lock pin is returned to its projected position and the axially movable pin is also returned to its projected position to hold the relay shaft between the same and the fixed pin.

4 Claims, 7 Drawing Figures

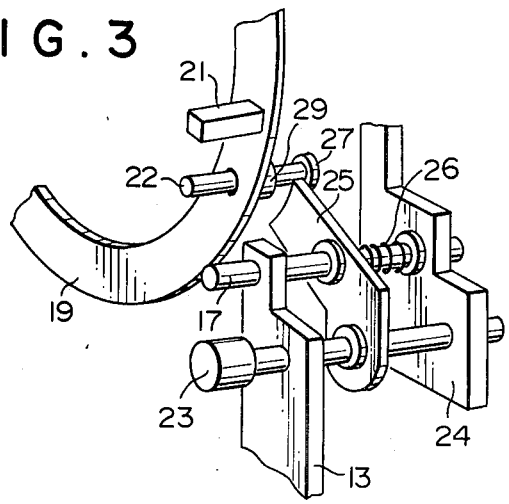
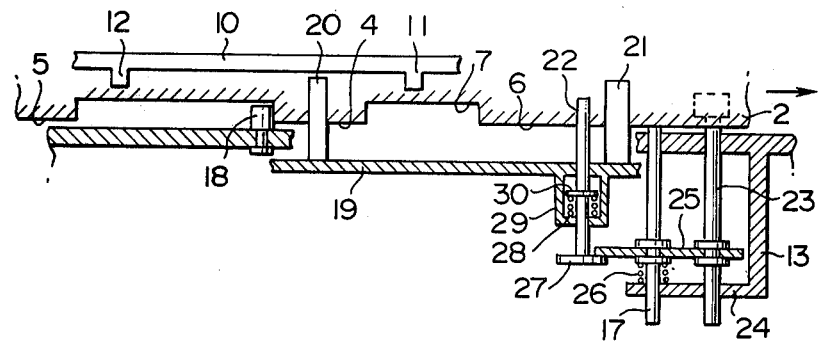
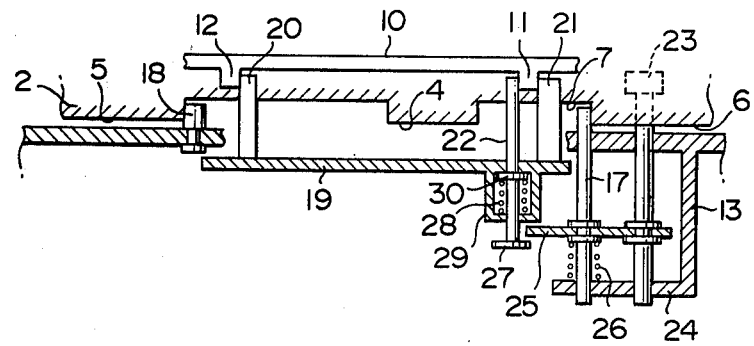

MEANS FOR MOUNTING AN INTERCHANGEABLE LENS ON A SINGLE LENS REFLEX CAMERA

BACKGROUND OF THE INVENTION

1. Field of the Invention

This invention relates to a lens mount for a single lens reflex camera, and more particularly to a means for mounting an interchangeable lens having a shutter mechanism to a camera body of a single lens reflex camera of lens shutter type.

2. Description of the Prior Art

In the conventional single lens reflex camera of lens shutter type which has a shutter unit in the lens barrel, a spigot bayonet mount is used for mounting an interchangeable lens to the camera body. In order to connect a shutter driving mechanism in the lens barrel with a shutter driving mechanism in the camera body, a slot or the like is provided in a shutter driving ring in the camera body and a relay shaft provided in the lens barrel is engaged with the slot before the lens barrel is attached to the camera body. After the relay shaft is engaged with the slot, the lens barrel is attached to the camera body and secured thereto by turning a clamp ring on the lens barrel.

The above described mount means is, however, disadvantageous in that the mounting is difficult when the camera body and the lens barrel are of the large weight. Since it is sometimes desired to quickly change interchangeable lenses, a mount means which facilitates the change of lenses even when the camera body and the lens are heavy is desired. The lens is heavy and the change of lenses is difficult particularly in the single lens reflex camera of lens shutter type which has a shutter unit in the interchangeable lens.

SUMMARY OF THE INVENTION

It is the primary object of the present invention to provide means for easily mounting an interchangeable lens having a shutter unit therein to a camera body of a single lens reflex camera of lens shutter type.

Another object of the present invention is to provide means for mounting an interchangeable lens having a shutter unit therein to a camera body which makes it possible for the interchangeable lens to be simply put on the lens mount face of the camera body and turned thereon to be mounted to the camera body.

The lens mount means in accordance with the present invention is characterized in that a fixed pin and an axially movable pin are provided on a camera side shutter drive ring so that these pins sandwich a relay shaft of the lens when the lens barrel is mounted to the camera body. The movable pin is first depressed when the lens is attached to the camera body. Then, when the lens is rotated up to a position where the lens is stopped, the movable pin is returned to the original projected position to sandwich the relay shaft with the fixed pin and the movable pin.

Therefore, in accordance with the lens mount means of this invention, there is no need to carefully position the relay shaft of the lens at an engaging slot or the like in the camera body when attaching the lens to the camera body. Accordingly, the lens barrel can be easily and quickly mounted to the camera body.

BRIEF DESCRIPTION OF THE DRAWING

FIG. 3 is a fragmentary perspective view showing the main part of the mount means in accordance with the present invention, FIG. 4 is a developed view showing the relation between the mount means on the camera body side and that on the interchangeable lens side where the lens is simply attached to the camera body, FIG. 5 is a developed view showing the relation between the mount means on the camera body side and that on the interchangeable lens side where the lens is mounted to the camera body.

DESCRIPTION OF THE PREFERRED EMBODIMENT

Figure 1:
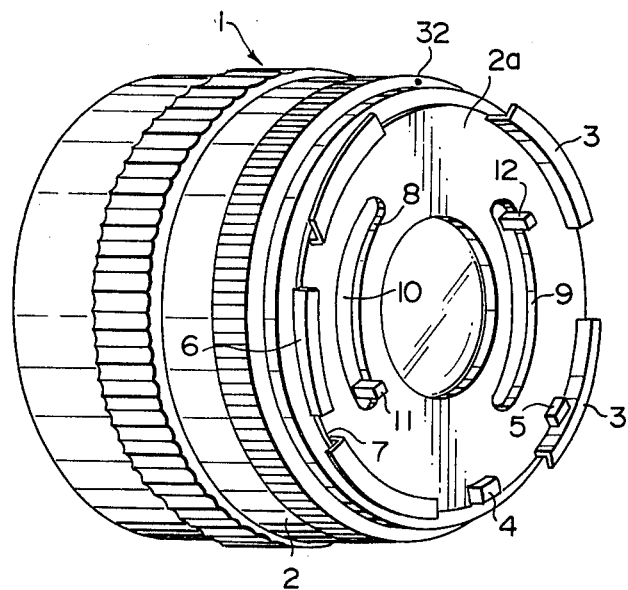
FIG. 1 is a perspective view of a lens barrel which is provided with the mount means in accordance with the present invention.

FIG. 1 shows an interchangeable lens 1 having a lens barrel 2 which is provided on the rear face 2a thereof with a plurality of outwardly bent bayonet claws 3. A pair of pins 4 and 5 are fixed to the surface of the rear face 2a inside the bayonet claws 3. The pair of pins 4 and 5 are located on a circle which is concentric with the lens barrel 2. On the same circle are further provided an arcuate guide rail 6 and a notch 7 adjacent thereto. Further, on the rear face 2a of the lens barrel 2 are provided a pair of symmetrically located arcuate slots 8 and 9. Through the slots 8 and 9, extend a pair of connecting pins 11 and 12 fixed on a shutter drive ring 10. The pins 11 and 12 are located symmetrically with respect to the center of the lens barrel 2.

Figure 2:
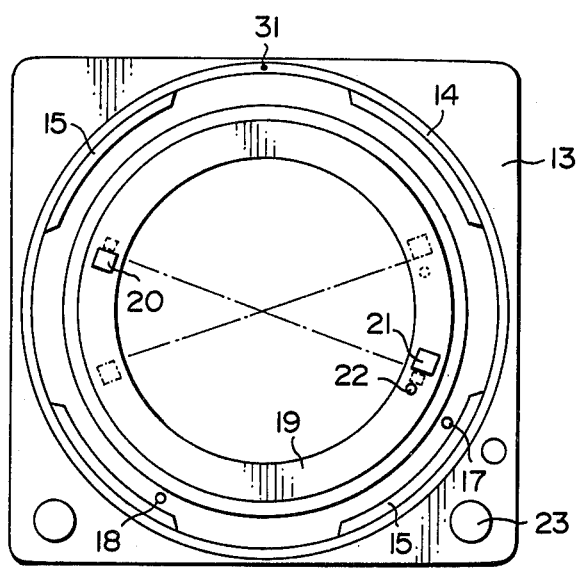
FIG. 2 is a front view showing the front face of a camera body which is provided with the mount means in accordance with the present invention.

FIG. 2 shows the front face of a camera body 13 which is provided with a lens mount 14. The lens mount 14 has a plurality of inwardly bent bayonet claws 15 which are engageable with said bayonet claws 3 on the lens barrel 2. Inside the bayonet claws 15 are provided a lock pin 17 and a stop pin 18. The lock pin 17 is axially movable in and out of the face of the camera body 13 and is engageable with said notch 7 formed on the face of the lens barrel 2. The stop pin is fixed to the face of the camera body 13 and is bought into engagement with said pins 4 and 5 fixed to the face of the lens barrel 2 so as to limit the rotation of the lens barrel 2 with respect to the camera body 13. Within the camera body 13 is rotatably provided a shutter drive ring 19 which has a pair of symmetrically located fixed pins 20 and 21. These fixed pins 20 and 21 are to be engaged with said connecting pins 11 and 12 to move the same by rotating the lens barrel 2. An axially movable 22 is provided on the face of the camera body 13 on the same circle as that on which said fixed pins 20 and 21 are located at a position separated from one of said pins 21 with a space therebetween corresponding to the width of said connecting pin 11 so that the connecting pin 11 is sandwiched between the fixed pin 21 and the axially movable pin 22.

As shown in FIG. 3, the lock pin 17 is associated with a lock release button 23 which is manually operable.

The lock release button 23 and the lock pin 17 are also associated with said movable pin 22 so that the movable pin 22 is moved inward to retract from the surface of the shutter drive ring 19 when the lock release button 23 or the lock pin 17 is depressed. The lock release button 23 and the lock pin 17 are slidably supported by a support plate 24 and are slidable in the direction of the axis of the lens barrel 2. A release member 25 is fixed to the lock pin 17 and the release button 23 and is urged to move the pin 17 and the button 23 in the projected position by means of a compression spring 26. Said movable pin 22 has at its end a flange 27 with which said release member 25 is engaged to move the movable pin 22 inward. The movable pin 22 is spring urged in the projected position by means of a compression spring 28 retained in a spring casing 29 as shown in FIGS. 4 to 7. As shown in FIGS. 4 to 7, the movable pin 22 is further provided with a flange 30 fixed thereto and the compression spring 28 is retained between the flange 30 and the internal wall of the spring casing 29 to urge the movable pin 22 in the projected position.

As shown in FIGS. 1 and 2, the front face of the camera body 13 is provided with an index 31 at a predetermined position on the periphery of the lens mount 14 and the interchangeable lens 1 is provided with an index 32 at a position to be aligned with the index 31 of the camera body 13.

Now the operation of the lens mount means in accordance with the present invention will be described in detail with reference to FIGS. 4 to 7. The interchangeable lens 1 is put on the front face of the camera body 13 with the index 32 thereof aligned with the index 31 of the camera body 13. At this stage, the stop pin 18 is located between the fixed pins 4 and 5 and the lock pin 17 abuts on the guide rail 6 and is depressed thereby as shown in FIG. 4. Since the lock pin 17 is depressed, the movable pin 22 is also depressed inward by means of the release member 25 overcoming the force of the spring 28.

Then, the interchangeable lens 1 is rotated in the direction shown by the arrow in FIG. 4 so that the bayonet claws 3 of the lens 1 are engaged with the bayonet claws 15 of the camera body 13. Thus, the lens 1 is rotated until the fixed pin 5 is stopped by the stop pin 18. When the lens 1 is brought to the position where it is stopped, the lock pin 17 of the camera body 13 falls into the notch 7 and the movable pin 22 is returned to its projected position. At this stage, since the connecting pin 11 of the lens 1 is in the position to abut on the fixed pin 21, the connecting pin 11 is sandwiched between the fixed pin 21 and the movable pin 22 as shown in FIG. 5.

Figure 6:
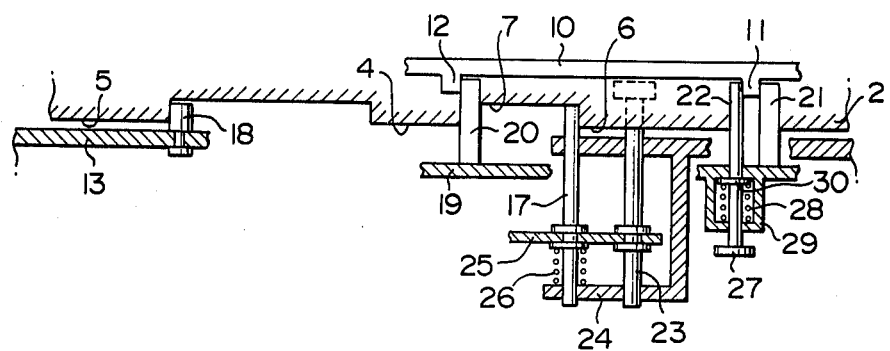
FIG. 6 is a view similar to FIGS. 4 and 5 where the shutter has been operated.

Then, as shown in FIG. 6, as the shutter drive ring 19 in the camera is rotated, the connecting pin 11 is moved by the fixed pin 21 and the movable pin 22 and the shutter drive ring 10 in the lens barrel 2 to which said connecting pin 11 is fixed is rotated. By the rotation of the shutter drive ring 10 in the lens barrel 2, the shutter in the lens is operated. At the same time when the shutter drive ring 19 in the camera body is rotated, the flange 27 of the movable pin 22 is removed from the release member 25. Thus, it becomes impossible to depress the movable pin 22 by depressing the lock release button 23. Therefore, it is impossible to remove the interchangeable lens 1 from the camera body 13.

Figure 7:
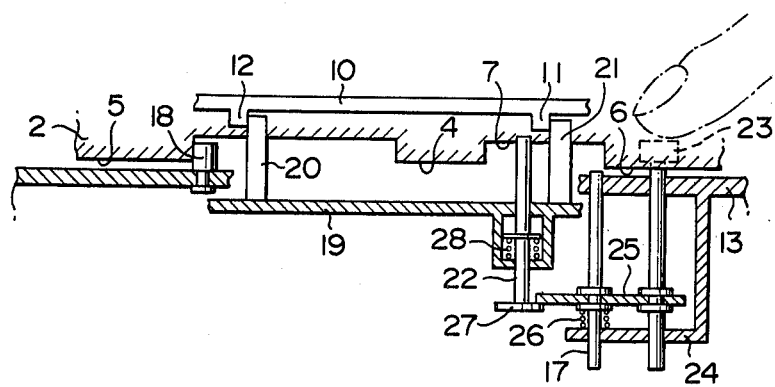
FIG. 7 is a view similar to FIGS. 4 and 6 where the interchangeable lens is being removed from the camera body.

After the shutter is operated, the shutter drive ring 19 is rotated back to its original position by turning a knob (not shown) as shown in FIG. 7. Accompanying the rotation of the shutter drive ring 19 in the camera body 13, the shutter drive ring 10 in the lens 1 is rotated by the engagement of the fixed pins 20 and 21 with the connecting pins 12 and 11, respectively. Thus, the shutter in the lens is opened. Immediately before the shutter is opened, a light shielding plate (not shown) is brought to a position to shield the film in the camera. Thus, a shutter cocking operation is completed and the light shielding plate is brought to the position to prevent the film in the camera from being exposed to light. Accordingly, the interchangeable lens can be removed from the camera body. At this stage as shown in FIG. 7, the release member 25 is engaged with the flange 27 of the movable pin 22. Therefore, the movable pin 22 is depressed to allow the rotation of the lens barrel 2 by depressing the manually operable lock release button 23. Together with the movable pin 22, the lock pin 17 is also depressed by the release member 25. Therefore, the lens 1 can be removed from the camera body 13 by turning the lens 1 in the direction opposite to said direction in which the lens 1 is rotated when it is mounted to the camera body 13.

We claim:

1. A means for mounting an interchangeable lens to a camera body wherein the interchangeable lens has a shutter unit and at least one connecting pin associated with the shutter unit is provided on the rear face of the interchangeable lens, said connecting pin being movable along an arcuate path concentrically extending with the lens barrel of the interchangeable lens, said camera body having a rotatable shutter drive ring rotatable about an axis which is aligned with the axis of said lens barrel, said mounting means comprising:

a fixed pin secured to said rotatable shutter drive ring and extended to the front at a front face of the camera body, an axially movable pin mounted on said rotatable shutter drive ring at a position separated from said fixed pin with a space therebetween, said space being large enough to allow said connecting pin of the lens to be positioned therein, said axially movable pin being movable between a projected position and a retracted position and being spring urged to the projected position, said movable pin holding said connecting pin between the same and said fixed pin when the same is in said projected position, a lock pin provided on the front face of the camera body extending in parallel to said axially movable pin and said fixed pin, said lock pin being axially movable between a projected position and a retracted position and being spring urged to the projected position, a release member coupled to said lock pin and engageable with said axially movable pin so that the latter is moved from said projected position to said retracted position in response to the movement of said lock pin from said projected position to said retracted position, an abutment portion formed on the rear face of the interchangeable lens which is brought into abutment with said lock pin to depress the same from said projected position to said retracted position when the interchangeable lens is attached to the front face of the camera body, and a recessed portion formed adjacent to said abutment portion on the rear face of the interchangeable lens which is brought into engagement with said lock pin, when the interchangeable lens is rotated up to a position where said connecting pin is located between said fixed pin and said axially movable pin, and allows said lock pin to return from said retracted position to said projected position, whereby said connecting pin of the interchangeable lens is sandwiched between said fixed pin and said axially movable pin when the interchangeable lens is rotated by a predetermined angle.

2. A lens mounting means as defined in claim 1 wherein said release member is connected with a manually operable lock release button projected on the front face of the camera body and movable in the direction parallel to said lock pin.

3. A lens mounting means as defined in claim 1 wherein said camera body is provided with a stop pin and said interchangeable lens is provided with a stopper to be engaged with said stop pin when said lens is rotated up to the position where said connecting pin is located between said fixed pin and said axially movable pin.

4. A lens mounting means as defined in claim 1 wherein said abutment portion is an arcuate protruded portion formed on the face of the interchangeable lens and said recessed portion is a notch formed adjacent thereto.

* * * * *